No. 773,400. PATENTED OCT. 25, 1904.
M. LEBLANC.
METHOD OF REGULATING CONSTANT CURRENT DYNAMOS.
APPLICATION FILED FEB. 26, 1903.
NO MODEL.
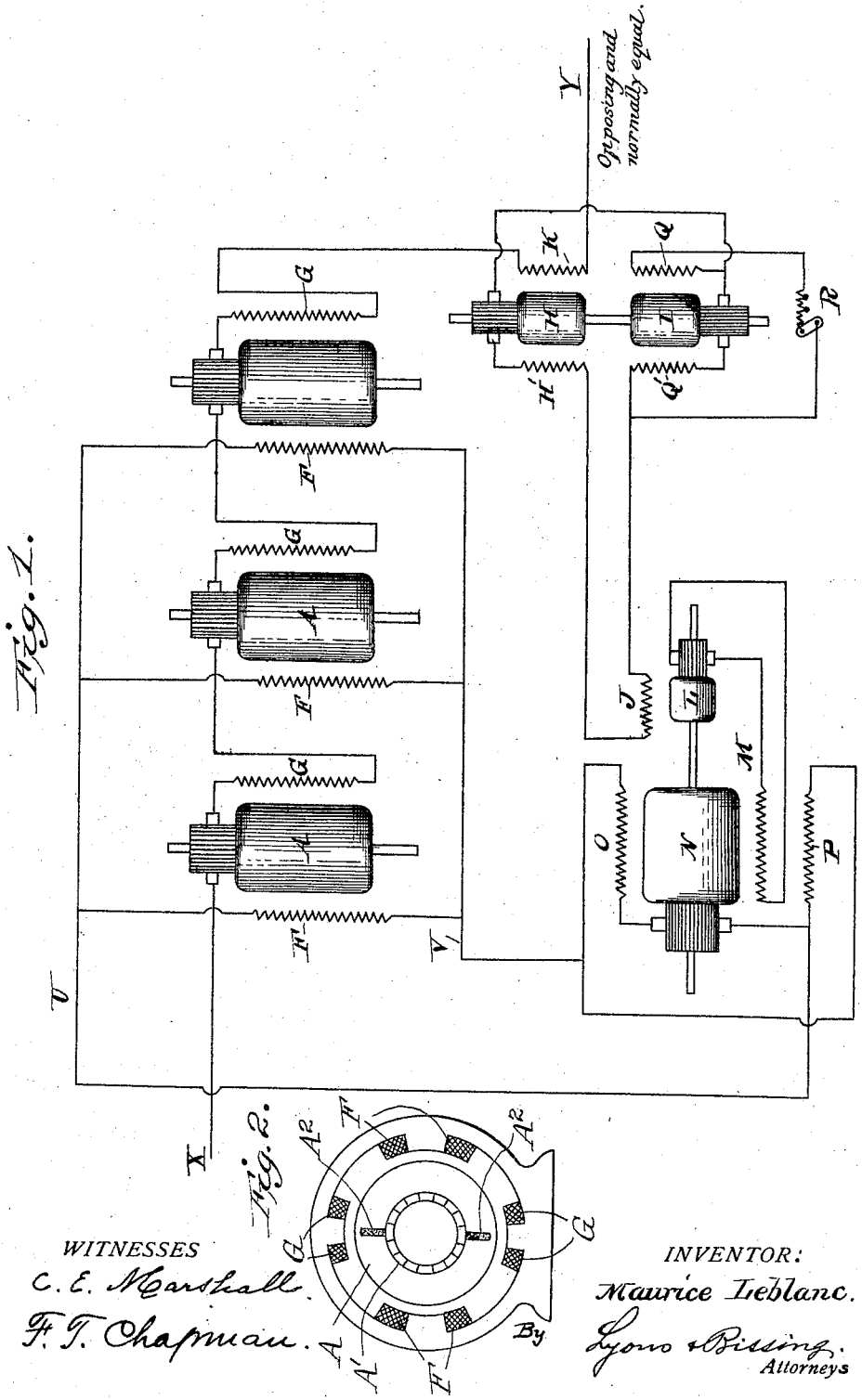
WITNESSES
C. E. Marshall
F. T. Chapman
INVENTOR:
Maurice Leblanc.
By Lyons & Bissing
Attorneys No. 773,400. Patented October 25, 1904.

UNITED STATES PATENT OFFICE.

MAURICE LEBLANC, OF PARIS, FRANCE.

METHOD OF REGULATING CONSTANT-CURRENT DYNAMOS.

SPECIFICATION forming part of Letters Patent No. 773,400, dated October 25, 1904.

Application filed February 26, 1903. Serial No. 145,285. (No model.)

*To all whom it may concern:*

Be it known that I, MAURICE LEBLANC, a citizen of the Republic of France, residing at Villa Montmorency, No. 1 Avenue de Bouffleurs, Paris, France, have invented a new and useful Method of Regulating Constant-Current Dynamos, of which the following is a specification.

The principal object of my invention is to so regulate a direct-current generator that it will supply a current of constant strength to the main line which it feeds irrespective of variation of load on the line.

To this end my invention consists in a method in accordance with which I keep the strength of the current fed by the generator to the main line normally constant or of predetermined value by supplying to the field of a dynamo which excites the generator a current which changes its direction under variations of strength of the main-line current. More specifically stated, this current which is supplied to the exciter-field has one direction when the current strength in the main line is below normal and an opposite direction when the current strength in the main line is above normal. In this manner I cause an increase of the electrical energy furnished by the exciter to the main generator when the main current is below normal and a decrease of the electrical energy furnished by the exciter to the main generator when the current on the main line is above normal, and thus keep the current strength on the main line practically constant.

My method of regulating the main generator to keep the current strength in the main line constant also comprises the step of supplying to the exciter-field a current which is determined by a constant voltage and an opposing voltage which is proportional to the strength of the main-line current. In this way I am enabled when the main-line current is of normal strength to have the opposing voltages neutralize each other. When the main-line current strength is below normal, the voltage which is proportional thereto is less in value than the constant voltage to which it is opposed, and current is thereby caused to flow in such a direction through the exciter-field as to increase the magnetization of the exciter-field and in consequence the current supplied by it to the main-line generator. When the main current strength is above normal, the voltage which is proportional thereto is greater than the voltage to which it is opposed, and current is supplied by these combined voltages to the exciter-field in a direction opposite to that before mentioned, so as to diminish the strength of the exciter-field and in consequence the electrical energy furnished by it to the main-line generator. This will enable the general principles of my invention to be understood.

I now come to describe it in more detail by reference to the drawings, in which—

Figure 1 shows a diagram of the circuit connections. Fig. 2 shows a sketch of the generator with its main and auxiliary poles.

The generators A, with commutators A' and brushes A², are each direct-current dynamos of the usual type, having their field-coils F separately excited by placing them in parallel circuit in the line U V, connected to the brushes of the exciter-dynamo N. In addition to the field-coils F, I also prefer to apply to the field of each dynamo A an auxiliary winding G in series with the armature-circuit of the dynamo. This auxiliary winding G is, however, not superposed upon the main poles of the machine, as are the field-coils F, but is superposed upon auxiliary field-poles about half-way between the main field-poles and above the brushes of the dynamo, as shown in Fig. 2. The auxiliary winding G is thereupon so proportioned as to develop a magnetizing force sufficient to neutralize the magnetizing force developed by the armature along the lines of the brushes. Under these conditions no electromotive force will be created by the rotation of the dynamo-armature in the sections of the armature placed in short circuit by the brushes, which means that sparking at the brushes will be avoided.

The exciter N is preferably a dynamo having a shunt field-winding P, and it may also have a field-winding O in series with its armature. This winding O is applied to the exciter-field upon auxiliary poles in line with the exciter-brushes, so as to neutralize any magnetizing force which may be developed by the exciter-armature in the neighborhood of the brushes, thereby avoiding sparking at the brushes in the manner just pointed out for the main generator A.

In addition to the shunt-winding P and the auxiliary winding O the field of the exciter N is provided with a winding M, which coacts with the winding P, preferably by having the windings M and P wound on the same main field-poles of the exciter. This winding M receives current in one direction—that is, in a direction to assist the magnetizing effect of the shunt-winding P—when the strength of the current in the main line X Y is below normal and in an opposite direction—that is, in a direction to counteract the effect of the shunt-winding P—when the strength of the current in the main line X Y is above normal. In this way the strength of the main-line current is kept constant.

In order to supply currents in respectively opposite directions to the field-winding M of the exciter N, I may make use of the source of constant voltage I, here shown as a compound-wound dynamo having a series field-winding Q' and a shunt field-winding Q, in which may be inserted a rheostat R. This dynamo turns at constant speed. I may, however, employ sources of constant voltage other than such a dynamo I. Placed in the same circuit with and in opposition to this dynamo I, and preferably mounted upon the same shaft therewith, is a dynamo H, which has a field-winding K inserted in the main line. This dynamo is so designed that as the strength of the current in the main line X Y increases or decreases the voltage which the dynamo H opposes to the dynamo I respectively increases or decreases. I may, however, add a series winding H' to the main field-poles of the dynamo H, so that the variation of voltage furnished by the dynamo H shall be more pronounced than the variation of current strength flowing through the main line and the field-winding K. If now I so arrange matters that when the current flowing in the main line X Y is of normal strength the voltage supplied by the dynamo H shall be equal to and of opposite sign with the constant voltage generated by the constant-potential dynamo I, it will be seen that no current will flow through the combined circuit of these two dynamos H I when the main current is of normal strength, which means that no current will flow through the winding J in this circuit at such time.

The winding J here referred to is the field-winding of a relay-dynamo L, whose armature may be mounted on the same shaft as the armature of the exciter N. The armature-circuit of this relay-dynamo L furnishes currents to the field-winding M, which currents flow in one or the other direction as the currents in the winding J flow in one or the other direction, respectively, it being understood, however, that the energy represented by the current in the winding M is much greater than the energy represented by the current in the winding J. The relay-dynamo L is thus seen to do no more than amplify the energy represented by currents in the winding J. When the direction of the current in the winding J changes, the direction of the current in the winding M also changes. This dynamo L might, therefore, in certain cases be dispensed with, in which case the winding J would take the place of the winding M and there would be no amplification of electrical energy.

My method of regulation now becomes clear. When current of normal strength is flowing through the main line X Y, and therefore through the field-winding K of the dynamo H, this dynamo H will generate a voltage which is equal in amount to but of opposite sign with the constant voltage generated by the dynamo I. Therefore no current will flow in the field-winding J of the relay-dynamo L, which means that no appreciable current will flow in the field-winding M of the exciter N. The exciter N will thus furnish to the field-coils F of the dynamos A an amount of electrical energy which is dependent upon the strength of the shunt-winding P of the exciter N.

When the strength of the current on the main line X Y rises above normal, the magnetization due to the field-coil K of the dynamo H increases, which means that the voltage furnished by the dynamo H will be greater than the voltage furnished by the source of constant electromotive force I. Current will then flow in a given direction through the field-winding J of the relay-dynamo L, and the amount of this current will be proportional to the difference of the voltages furnished by the two dynamos H and I. The same remark which has just been made with respect to the current flowing in the winding J applies to the current which now flows in the winding M. This current in the winding M will have a direction such as to subtract from the magnetizing force due to the shunt-winding P of the exciter N. The strength of the field of this exciter will therefore be diminished, which means that it will furnish less energy to the field-windings F of the main generators A, so that these main generators will furnish less current to the main line to reduce the main-line current to its normal strength.

When the strength of the current in the main line X Y falls below normal, actions similar to those just described will take place, excepting that the current which is now caused to flow in the winding M of the exciter N has a direction which tends to add to the magnetizing force produced by the shunt-winding P, so that this exciter now sends more electrical energy to the field-windings F of the main generators A, which are thus caused to increase the supply of the current which they send to the main line to its normal strength.

It is readily apparent that the dimensions of the dynamos H I and of the relay L are small compared to the dimensions of the exciter N. It is well known that one may construct a continuous-current dynamo the mean power in the shunt-winding of which will not expend over two per cent. of the electrical energy given off by the dynamo under full load. If, therefore, to fix ideas we suppose that the exciter N under full load furnishes one hundred kilowatts of electrical energy, it will readily be seen that it is normally sufficient to expend one kilowatt of energy in each of its field-windings M and P, since the effect of these windings is additive.

When the voltage at the brushes of the exciter N decreases, the current in the shunt-winding P decreases. By decreasing the current in the winding M we decrease the strength of the exciter-field and the voltages at the brushes of the exciter. We therefore also decrease the current in the winding P. There results from this that we may render zero the sum of the magnetizing forces developed by the circuit M and P—that is to say, we may bring about the complete nullification of the field of the exciter—before having been obliged to give to the intensity of the current in the circuit M a value equal to and of opposite sign with that which it had when the exciter was under full load. Therefore we can vary the exciter-field from its maximum strength down to zero strength by expending no more than one kilowatt in the inductor-circuit M. This means that the power of the dynamo supplying the relay L need not be more than one per cent. of the power of the exciter.

I may here remark that the main generators A should have the magnetic parts of their field thoroughly laminated and very permeable, the air-space being reduced to a minimum and saturation being avoided. The same remarks apply to the construction of the exciter. It is also evident that I may vary the normal current strength upon the main line by increasing or decreasing the resistance of the rheostat R in the shunt-winding Q of the compound dynamo I. By so doing the normal value of the constant voltage furnished by the compound dynamo I is changed and the normal value of the constant strength of the current on the main line is correspondingly changed. Under this aspect of my invention I need not keep the current strength on the line always at la fixed value, but may keep it rather at a predetermined value, which may vary from time to time, the word "predetermined" including the word "constant" as a special case.

I claim—

1. The process of exciting a current-generator which consists in varying the electrical energy furnished by the exciter to keep the strength of the current fed by the generator to the main line at a predetermined value, by supplying to the exciter-field a current which changes its direction under a variation of strength of the main-line current, substantially as described.

2. The process of exciting a current-generator which consists in varying the electrical energy furnished by the exciter to keep the strength of the current fed by the generator to the main line normally constant, by supplying to the exciter-field a current which has one direction when the main current strength is above normal and an opposite direction when the main current strength is below normal, substantially as described.

3. The process of exciting a current-generator which consists in varying the electrical energy furnished by the exciter to keep the strength of the current fed by the generator to the main line of predetermined value by supplying to the exciter-field a current which is determined by a voltage of predetermined value and an opposing voltage which varies with the strength of the main-line current, substantially as described.

In testimony whereof I have signed my name to this specification in the presence of two subscribing witnesses.

MAURICE LEBLANC.

Witnesses:
 ARMAND LEBLANC,
 AUGUSTUS E. INGRAM.